(12) United States Patent
Tsukamoto et al.

(10) Patent No.: US 10,516,354 B2
(45) Date of Patent: Dec. 24, 2019

(54) MOTOR CONTROL DEVICE

(71) Applicant: Sanden Automotive Components Corporation, Isesaki-shi, Gunma (JP)

(72) Inventors: Takeo Tsukamoto, Isesaki (JP); Masafumi Hotta, Isesaki (JP); Daisuke Hirono, Isesaki (JP)

(73) Assignee: Sanden Automotive Components Corporation, Isesaki-shi, Gunma (JP)

( * ) Notice: Subject to any disclaimer, the term of this patent is extended or adjusted under 35 U.S.C. 154(b) by 0 days.

(21) Appl. No.: 16/084,799

(22) PCT Filed: Feb. 24, 2017

(86) PCT No.: PCT/JP2017/008393
§ 371 (c)(1),
(2) Date: Sep. 13, 2018

(87) PCT Pub. No.: WO2017/159392
PCT Pub. Date: Sep. 21, 2017

(65) Prior Publication Data
US 2019/0074781 A1 Mar. 7, 2019

(30) Foreign Application Priority Data
Mar. 15, 2016 (JP) ................................. 2016-051398

(51) Int. Cl.
H02P 6/182 (2016.01)
(52) U.S. Cl.
CPC .................... H02P 6/182 (2013.01)
(58) Field of Classification Search
CPC ...................................................... H02P 6/182
(Continued)

(56) References Cited

U.S. PATENT DOCUMENTS 6,738,718 B2 * 5/2004 Kurnia ................ G01R 31/343
702/41

FOREIGN PATENT DOCUMENTS

JP 2003-259678 A 9/2003
JP 2004-248394 A 9/2004
(Continued)

OTHER PUBLICATIONS

Japan Patent Office, International Search Report issued in International Application No. PCT/JP2017/008393, dated Apr. 25, 2017.
(Continued)

Primary Examiner — David Luo
(74) Attorney, Agent, or Firm — Baker Botts L.L.P.

(57) ABSTRACT

To provide a motor control device capable of determining a rotor position with high accuracy not only in normal control but also in flux-weakening control. The motor control device includes: a first rotor position determining unit 28 that determines a rotor position of a synchronous motor by using a rotor position calculation formula with, as parameters, current electrical angle or induced voltage electrical angle, and first current phase or first induced voltage phase obtained based on current peak value and [(induced voltage electrical angle)−(current electrical angle)]; a second rotor position determining unit 29 that determines a rotor position of the synchronous motor by using a rotor position calculation formula with, as parameters, current electrical angle or induced voltage electrical angle, and second current phase or second induced voltage phase obtained based on current peak value and flux linkage of a rotor of the synchronous motor; and a selecting unit 30 that selects the first or second rotor position determining unit 28, 29.

6 Claims, 5 Drawing Sheets

(58) Field of Classification Search
USPC ..... 318/400.35, 400.34, 400.32, 400.01, 700
See application file for complete search history.

(56) References Cited

FOREIGN PATENT DOCUMENTS

| | | |
|---|---|---|
| JP | 2011-010438 A | 1/2011 |
| JP | 2012-228127 A | 11/2012 |

OTHER PUBLICATIONS

The International Bureau of WIPO, International Preliminary Report on Patentability (Chapter I of the Patent Cooperation Treaty) issued in International Application No. PCT/JP2017/008393, dated Sep. 18, 2018.

* cited by examiner

MOTOR CONTROL DEVICE

CROSS-REFERENCE TO RELATED APPLICATIONS

This application is a U.S. National Stage patent application under 37 U.S.C. § 371 of International Patent Application No. PCT/JP2017/008393, filed on Feb. 24, 2017, which claims the benefit of Japanese Patent Application No. JP 2016-051398, filed on Mar. 15, 2016, the disclosures of which are incorporated herein by reference in their entirety.

TECHNICAL FIELD

The present invention relates to a motor control device having a function of determining a rotational position of a rotor (hereinafter, simply referred to as "rotor position") of a synchronous motor, without use of a sensor.

BACKGROUND ART

As an example of such a motor control device, a motor control device disclosed in Patent Document 1 is known. The motor control device of Patent Document 1 determines a current peak value, a current electrical angle and an induced voltage electrical angle, and determines a rotor position based on the current peak value and [(induced voltage electrical angle)−(current electrical angle)]. Specifically, the motor control device obtains a current phase or an induced voltage phase from a data table generated in advance and including the current peak value and [(induced voltage electrical angle)−(current electrical angle)] as parameters, and the motor control device determines a rotor position by using a rotor position calculation formula expressed as "(rotor position)=(current electrical angle)−(current phase)−90°" or "(rotor position)=(induced voltage electrical angle)−(induced voltage phase)−90°".

REFERENCE DOCUMENT LIST

Patent Documents

Patent Document 1: JP 2011-10438 A

SUMMARY OF THE INVENTION

Problem to be Solved by the Invention

There is concern that when a flux-weakening control is carried out to achieve, for example, a high-speed rotation in the abovementioned conventional motor control device, that is, when the current phase is greatly advanced to increase the d-axis current (negative), an erroneous rotor position might be obtained. Hereinbelow, this concern will be described.

FIG. 7A illustrates an example of a motor vector diagram in the normal control, and FIG. 7B illustrates an example of a motor vector diagram in the flux-weakening control. Comparing FIGS. 7A and 7B, current peak valve Ip and [(induced voltage phase γ)−(current phase β)] corresponding to [(induced voltage electrical angle)−(current electrical angle)] are the same in both FIGS. 7A and 7B, whereas current phase β and induced voltage phase γ in FIG. 7A are different from those in FIG. 7B. This indicates that a current phase and an induced voltage phase that correspond to a current peak value and [(induced voltage electrical angle)−(current electrical angle)] are not always the same. Thus, there is concern that in the abovementioned conventional motor control device configured to obtain the current phase or the induced voltage phase from the data table including the current peak value and [(induced voltage electrical angle)−(current electrical angle)] as parameters, a state illustrated in FIG. 7A and that in FIG. 7B cannot be distinguished, and thus, when, for example, the flux-weakening control is carried out, a rotor position might be determined using a current phase (or an induced voltage phase) which differs from an actual current phase (or an actual induced voltage phase), (i.e., an erroneous rotor position might be obtained).

Thus, an object of the present invention is to provide a motor control device capable of determining a rotor position with high accuracy not only in the normal control but also in the flux-weakening control, for example.

Means for Solving the Problem

According to an aspect of the present invention, a motor control device comprises:

a current determining unit that determines a current flowing through a stator coil of a synchronous motor;

an applied voltage determining unit that determines an applied voltage applied to the stator coil;

a current-peak-value-and-electrical-angle determining unit that determines a current peak value and a current electrical angle based on a current determined by the current determining unit;

an induced-voltage-peak-value-and-electrical-angle determining unit that determines an induced voltage peak value and an induced voltage electrical angle based on a current determined by the current determining unit and an applied voltage determined by the applied voltage determining unit;

a flux linkage determining unit that determines a flux linkage of a rotor based on an induced voltage peak value and a rotational speed of the synchronous motor;

a first rotor position determining unit that determines a rotor position of the synchronous motor by using a rotor position calculation formula with, as parameters, a current electrical angle or an induced voltage electrical angle, and a first current phase or a first induced voltage phase obtained based on a current peak value and [(induced voltage electrical angle)−(current electrical angle)];

a second rotor position determining unit that determines a rotor position of the synchronous motor by using a rotor position calculation formula with, as parameters, a current electrical angle or an induced voltage electrical angle, and a second current phase or a second induced voltage phase obtained based on a current peak value and a flux linkage; and a selecting unit that selects one of the first rotor position determining unit and the second rotor position determining unit.

According to another aspect of the present invention, a motor control device comprises:

a current determining unit that determines a current flowing through a stator coil of a synchronous motor;

an applied voltage determining unit that determines an applied voltage applied to the stator coil;

a current-peak-value-and-electrical-angle determining unit that determines a current peak value and a current electrical angle based on a current determined by the current determining unit;

an induced-voltage-peak-value-and-electrical-angle determining unit that determines an induced voltage peak value and an induced voltage electrical angle based on a current determined by the current determining unit and an applied voltage determined by the applied voltage determining unit;

a flux linkage determining unit that determines a flux linkage of a rotor based on an induced voltage peak value and a rotational speed of the synchronous motor;

a first rotor position determining unit that determines a rotor position of the synchronous motor by using a rotor position calculation formula with, as parameters, a current electrical angle or an induced voltage electrical angle, and a first current phase or a first induced voltage phase obtained based on a current peak value and [(induced voltage electrical angle)−(current electrical angle)];

a second rotor position determining unit that determines a rotor position of the synchronous motor by using a rotor position calculation formula with, as parameters, a current electrical angle or an induced voltage electrical angle, and a second current phase or a second induced voltage phase obtained based on a current peak value and a flux linkage; and a rotor position deciding unit that decides a final rotor position by obtaining a weighted sum of a rotor position determined by the first rotor position determining unit and a rotor position determined by the second rotor position determining unit.

Effects of the Invention

According to these motor control devices, since the selecting unit appropriately selects the first rotor position determining unit or the second rotor position determining unit, or the rotor position deciding unit obtains a weighted sum by using appropriate weight factors, it is possible to determine a rotor position with high accuracy not only in the normal control but also in the flux-weakening control.

BRIEF DESCRIPTION OF THE DRAWINGS

FIG. 5A to 5C are graphs for illustrating a data table for use in a first rotor position determining unit and a data table for use in a second rotor position determining unit, in which FIG. 5A is a graph showing a case in which the phase current peak value is low, FIG. 5B is a graph showing a case in which the phase current peak value is moderate, and FIG. 5C is a graph showing a case in which the phase current peak value is high.

FIGS. 7A and 7B are views illustrating concern about a conventional motor control device, in which FIG. 7A is an example of a motor vector diagram in the normal control, and FIG. 7B is an example of a motor vector diagram in the flux-weakening control.

MODE FOR CARRYING OUT THE INVENTION

Figure 1:
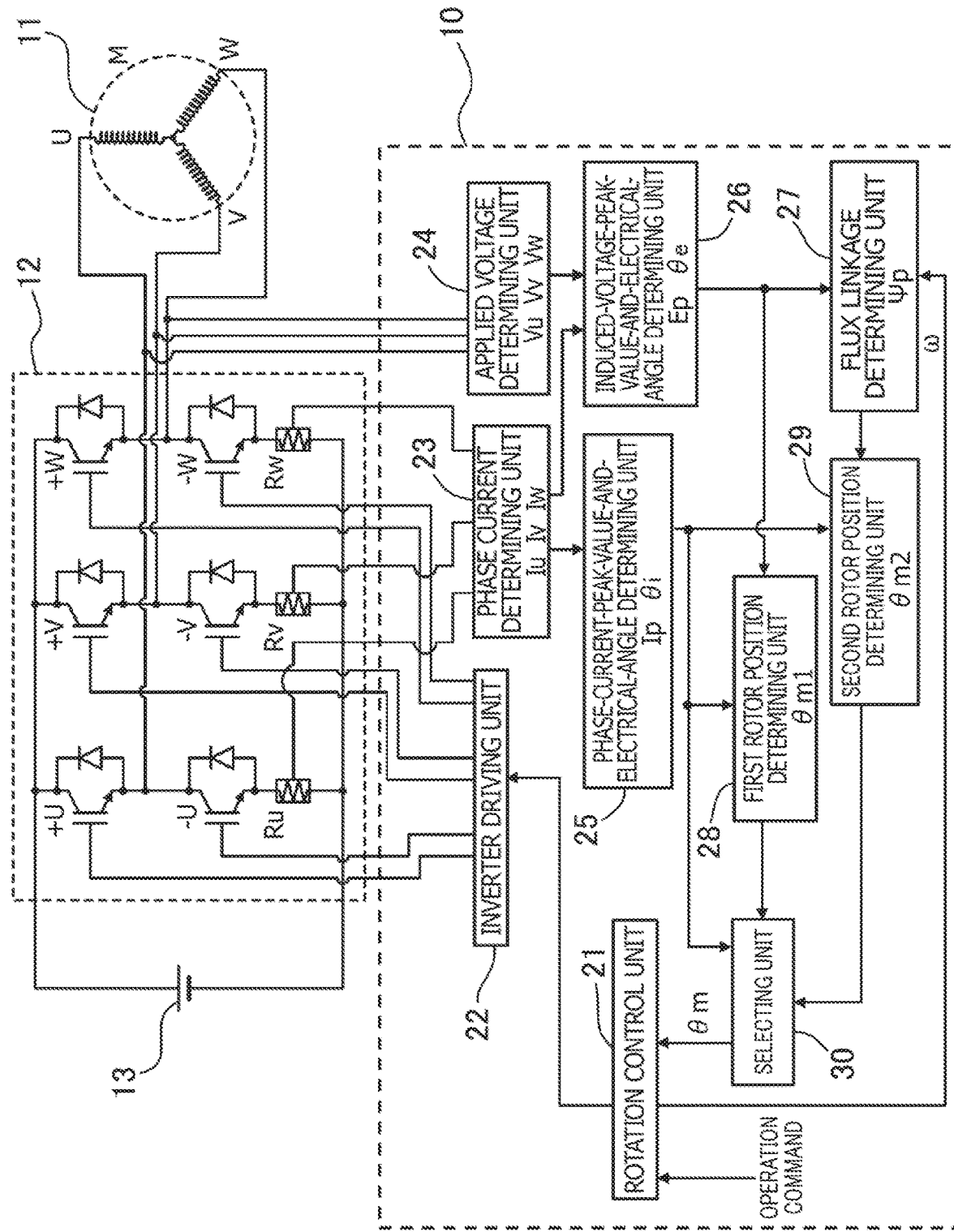
FIG. 1 is a block diagram of a motor control device according to an embodiment of the present invention.

FIG. 1 is a block diagram of a motor control device according to an embodiment of the present invention. A motor control device 10 according to the present embodiment has a function of determining a rotor position of a synchronous motor 11, without use of a sensor. Furthermore, the motor control device 10 is mainly configured to control an inverter 12, and the inverter 12 is configured to convert a direct-current power from a direct-current power supply 13 into an alternating-current power to supply the converted power to the synchronous motor 11.

The synchronous motor 11 is a three-phase star connected motor having a stator including U-, V- and W-phase stator coils, and a rotor including a permanent magnet. Only U-, V- and W-phase stator coils are indicated in the figures and the remainder is not illustrated. Although a star-connected motor is illustrated as an example, a delta connection may be equally applicable.

In the inverter 12, upper arm switching elements +U, +V, +W and lower arm switching elements −U, −V, −W are connected in series between the high-level side and the low-level side of the direct-current power supply 13 in each of the U-, V- and W-phases. On the low-level side of the lower arm switching elements −U, −V, −W, shunt resistors Ru, Rv, Rw for determining current flowing through each phase are provided.

The motor control device 10 includes a rotation control unit 21, an inverter driving unit 22, a phase current determining unit (current determining unit) 23, an applied voltage determining unit 24, a phase-current-peak-value-and-electrical-angle determining unit (current-peak-value-and-electrical-angle determining unit) 25, an induced-voltage-peak-value-and-electrical-angle determining unit 26, a flux linkage determining unit 27, a first rotor position determining unit 28, a second rotor position determining unit 29 and a selecting unit 30.

The rotation control unit 21 outputs, to the inverter driving unit 22, a control signal for making the synchronous motor 11 rotate by predetermined rotational speed ω or for stopping the synchronous motor 11 based on an operation command from an operating unit (not illustrated) and rotor position θm. As described below, rotor position θm is first rotor position θm1 determined by the first rotor position determining unit 28 or second rotor position θm2 determined by the second rotor position determining unit 29.

The inverter driving unit 22 drives each of the switching elements +U to −W of the inverter 12 to be turned on and off based on a control signal from the rotation control unit 21, to perform sine wave energization (180-degree energization) to each of U-, V- and W-phase stator coils.

The phase current determining unit 23 determines U-phase current Iu flowing through the U-phase stator coil, V-phase current Iv flowing through the V-phase stator coil, and W-phase current Iw flowing through the W-phase stator coil by measuring voltage applied to the shunt resistors Ru, Rv, Rw.

The applied voltage determining unit 24 determines U-phase applied voltage Vu, V-phase applied voltage Vv and W-phase applied voltage Vw applied to the corresponding U-, V- and W-phase stator coils from the corresponding upper arm switching elements +U to +W.

The phase-current-peak-value-and-electrical-angle determining unit 25 determines phase current peak value Ip and phase current electrical angle θi (stator αβ coordinate system) based on phase currents Iu, Iv, Iw determined by the current determining unit 21. A determining method of phase current peak value Ip and phase current electrical angle θi is as follows.

Figure 2:
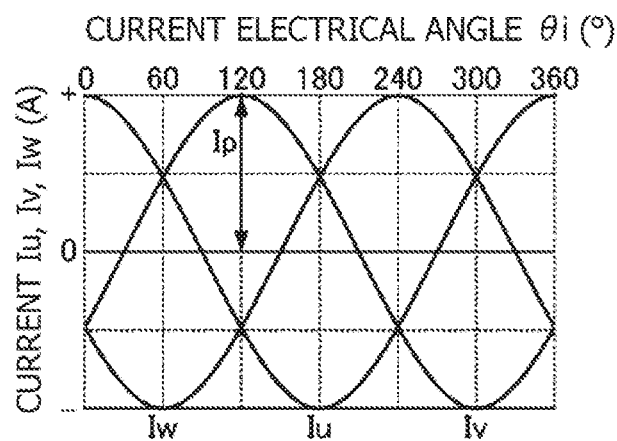
FIG. 2 is a phase current waveform diagram when sine wave energization is performed.

FIG. 2 is a phase current waveform diagram when sine wave energization is performed to the U-, V- and W-phases. Phase differences among U-, V- and W-phase currents Iu, Iv, Iw each forming a sine waveform are 120°. According to the phase current waveform diagram, Formula 1 described below holds among phase currents Iu, Iv, Iw, phase current peak value Ip and phase current electrical angle θi. The phase-current-peak-value-and-electrical-angle determining unit 25 obtains phase current peak value Ip and phase current electrical angle θi based on U-, V- and W-phase currents Iu, Iv, Iw determined by the phase current determining unit 23 by the following Formula 1.

$$Iu = Ip \times \cos(\theta i)$$

$$Iv = Ip \times \cos(\theta i - \tfrac{2}{3}\pi)$$

$$Iw = Ip \times \cos(\theta i + \tfrac{2}{3}\pi) \qquad \text{Formula 1}$$

The induced-voltage-peak-value-and-electrical-angle determining unit 26 determines induced voltage peak value Ep and induced voltage electrical angle θe (stator αβ coordinate system) based on phase currents Iu, Iv, Iw determined by the phase current determining unit 23 and applied voltages Vu, Vv, Vw determined by the applied voltage determining unit 24. A determining method of induced voltage peak value Ep and induced voltage electrical angle θe is as follows.

Figure 3:
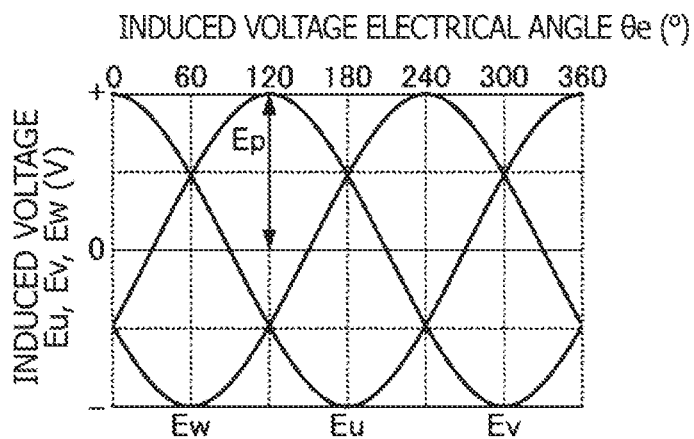
FIG. 3 is an induced voltage waveform diagram when sine wave energization is performed.

FIG. 3 is an induced voltage waveform diagram when sine wave energization is performed to the U-, V- and W-phases. Phase differences among U-, V- and W-phase induced voltages Eu, Ev, Ew each forming a sine waveform are 120°. According to the induced voltage waveform diagram, the following Formula 2 holds among induced voltages Eu, Ev, Ew, induced voltage peak value Ep and induced voltage electrical angle θe.

$$Eu = Ep \times \cos(\theta e)$$

$$Ev = Ep \times \cos(\theta e - \tfrac{2}{3}\pi)$$

$$Ew = Ep \times \cos(\theta e + \tfrac{2}{3}\pi) \qquad \text{Formula 2}$$

On the other hand, the following Formula 3 holds among applied voltages Vu, Vv, Vw, phase currents Iu, Iv, Iw, resistances Rcu, Rcv, Rcw of the stator coils (known as motor parameters) and induced voltages Eu, Ev, Ew.

$$Vu - Iu \times Rcu = Eu$$

$$Vv - Iv \times Rcv = Ev$$

$$Vw - Iw \times Rcw = Ew \qquad \text{Formula 3}$$

The induced-voltage-peak-value-and-electrical-angle determining unit 26 obtains U-, V- and W-phase induced voltages Eu, Ev, Ew by Formula 3 based on U-, V- and W-phase currents Iu, Iv, Iw determined by the phase current determining unit 23, and U-, V- and W-phase applied voltages Vu, Vv, Vw determined by the applied voltage determining unit 24, and then, obtains induced voltage peak value Ep and induced value electrical angle θe by Formula 2 based on the obtained U-, V- and W-phase induced voltages Eu, Ev, Ew.

The flux linkage determining unit 27 determines flux linkage Ψp (=Ep/ω) of the rotor based on induced voltage peak value Ep determined by the induced-voltage-peak-value-and-electrical-angle determining unit 26 and rotor rotational speed ω (obtained previously) received from the rotation control unit 21.

The first rotor position determining unit 28 determines a rotor position based on phase current peak value Ip and phase current electrical angle θi determined by the phase-current-peak-value-and-electrical-angle determining unit 25, and induced voltage electrical angle θe determined by the induced-voltage-peak-value-and-electrical-angle determining unit 26. Specifically, the first rotor position determining unit 28 determines a rotor position from phase current electrical angle θi and a current phase, the current phase being obtained based on phase current peak value Ip and [(induced voltage electrical angle θe)−(phase current electrical angle θi)]. Hereinafter, a rotor position determined by the first rotor position determining unit 28 is referred to as "first rotor position θm1" and a current phase obtained based on phase current peak value Ip and [(induced voltage electrical angle θe)−(phase current electrical angle θi)] is referred to as "first current phase β1".

The first rotor position determining unit 28 determines first rotor position θm1 by using a first rotor position calculation formula (Formula 4, described below) with, as parameters, phase current electrical angle θi and first current phase β1 obtained based on phase current peak value Ip and [(induced voltage electrical angle θe)−(phase current electrical angle θi)].

$$\text{(First rotor position } \theta m1) = \text{(phase current electrical angle } \theta i) - \text{(first current phase } \beta 1) - 90° \qquad \text{Formula 4}$$

First current phase β1 in Formula 4 is selected by referring to a data table TA, the data table TA being generated in advance and including phase current peak value Ip and [(induced voltage electrical angle θe)−(phase current electrical angle θi)] as parameters. For example, the data table TA may be generated as follows, and stored in advance in a memory.

Figure 4:
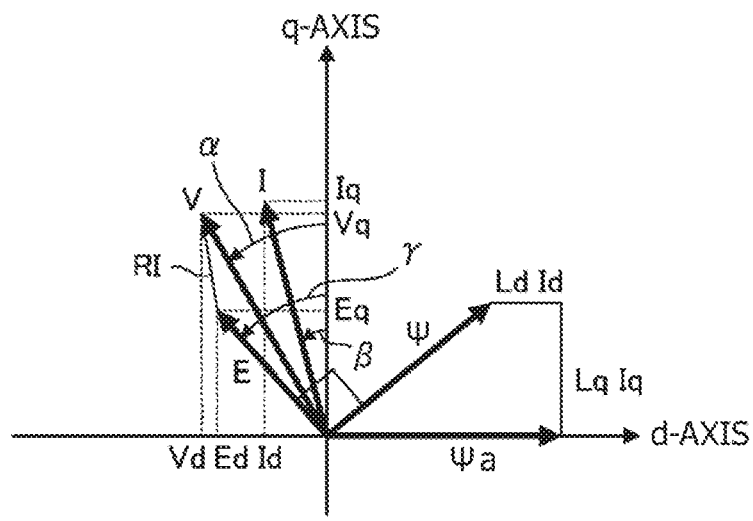
FIG. 4 is a motor vector diagram of a rotor coordinate system (d-q coordinate system).

FIG. 4 is a motor vector diagram when the rotor of the synchronous motor 11 is rotating. The diagram illustrates the relationships among applied voltage V (Vu to Vw), current I (Iu to Iw) and induced voltage E (Eu to Ew) expressed by vectors in d-q coordinate. Induced voltage E is expressed by [ωΨ]. In FIG. 4, Vd is a d-axis component of applied voltage V, Vq is a q-axis component of applied voltage V, Id is a d-axis component of current I, Iq is a q-axis component of current I, Ed is a d-axis component of induced voltage E, and Eq is a q-axis component of induced voltage E. A voltage phase with respect to the q-axis is α, a current phase with respect to the q-axis is β, and an induced voltage phase with respect to the q-axis is γ. In the diagram, Ψa is a magnetic flux of a permanent magnet, Ld is a d-axis inductance, Lq is a q-axis inductance, R is a resistance value of a stator coil (Rcu to Rcw), and Ψ is a flux linkage of the rotor.

The following Formula 5 can be derived from this motor vector diagram, and this can be rewritten as the following Formula 6 by transposing values regarding ω from the right-hand side to the left-hand side of Formula 5.

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega \Psi a \end{pmatrix} \qquad \text{Formula 5}$$

$$\begin{pmatrix} Ed/\omega = (Vd - Id \times R)/\omega \\ Eq/\omega = (Vq - Iq \times R)/\omega \end{pmatrix} = \begin{pmatrix} 0 & -Lq \\ Lq & 0 \end{pmatrix} \begin{pmatrix} Id \\ Iq \end{pmatrix} + \begin{pmatrix} 0 \\ \Psi a \end{pmatrix} \qquad \text{Formula 6}$$

Based on the fact that Formula 5 and Formula 6 hold in the motor vector diagram of FIG. 4 as described in the foregoing, the data table TA is generated in advance. That is, the data table TA of current phase (first current phase β1), including phase current peak value Ip corresponding to current I and [(induced voltage electrical angle θe)−(phase current electrical angle θi)] corresponding to [(induced voltage phase γ)−(current phase β)] as parameters, is generated by storing current phases β at the time when [(induced voltage phase γ)–(current phase β)] becomes predetermined values while progressively increasing current phase β and current I indicated in the motor vector diagram within predetermined ranges.

Specifically, for example, while increasing current phase β from −180° to 180° by 0.001° and increasing current I from 0 A to 64 A by 1 A, voltage phases α, current phases β, and induced voltage phases γ are obtained based on the motor vector diagram, using intrinsic d- and q-axis inductances Ld, Lq of the synchronous motor 11. Then, current phases β at the time when [(induced voltage phase γ)–(current phase β)] becomes 1°, 2°, 3°, . . . , are stored. Thereby generated is the data table TA of first current phase β1, including phase current peak value Ip corresponding to current I as a parameter, and [(induced voltage electrical angle θe)–(phase current electrical angle θi)] corresponding to [(induced voltage phase γ)–(current phase β)] as another parameter.

Then, the first rotor position determining unit 28 determines (calculates) first rotor position θm1 by inserting phase current electrical angle θi and first current phase β1 that is selected from the data table TA based on phase current peak value Ip and [(induced voltage electrical angle θe)–(phase current electrical angle θi)], into the abovementioned first rotor position calculation formula (Formula 4).

The second rotor position determining unit 29 determines a rotor position based on phase current peak value Ip determined by the phase-current-peak-value-and-electrical-angle determining unit 25 and flux linkage Ψp determined by the linkage determining unit 27. Specifically, the second rotor position determining unit 29 determines a rotor position from phase current electrical angle θi and a current phase that is obtained based on phase current peak value Ip and flux linkage Ψp. Hereinafter, a rotor position determined by the second rotor position determining unit 29 is referred to as "second rotor position θm2" and a current phase obtained based on phase current peak value Ip and flux linkage Ψp is referred to as "second current phase β2".

The second rotor position determining unit 29 determines second rotor position θm2 by using a second rotor position calculation formula (the following Formula 7) with, as parameters, phase current electrical angle θi and second current phase β2 obtained based on phase current peak value Ip and flux linkage Ψp.

$$\text{(Second rotor position } \theta m2) = \text{(phase current electrical angle } \theta i) - \text{(second current phase } \beta 2) - 90° \quad \text{Formula 7}$$

Second current phase β2 in Formula 7 is selected by referring to a data table TB, the data table TB being generated in advance and including phase current peak value Ip and flux linkage Ψp as parameters. For example, the data table TB may be generated as follows, and stored in advance in a memory.

The data table TB in this case is also generated in advance based on the fact that Formula 5 and Formula 6 hold in the motor vector diagram of FIG. 4. That is, the data table TB of a current phase (second current phase β2), including phase current peak value Ip corresponding to current I and flux linkage Ψp determined by the linkage determining unit 27 corresponding to flux linkage Ψ, as parameters, is generated by storing current phases β at the time when flux linkage Ψ becomes predetermined values while progressively increasing current phase β and current I indicated in the motor vector diagram within predetermined ranges.

Specifically, for example, while increasing current phase β from −180° to 180° by 0.001° and increasing current I from 0 A to 64 A by 1 A, induced voltage phases γ and flux linkages Ψ are obtained. Then, current phase β corresponding to each flux linkage Ψ is stored. Thereby generated is the data table TB of second current phase β2 including phase current peak value Ip corresponding to current I as a parameter, and flux linkage Ψp determined by the linkage determining unit 27 corresponding to flux linkage Ψ as another parameter.

The second rotor position determining unit 29 determines (calculates) second rotor position θm2 by inserting phase current electrical angle θi and second current phase β2 that is selected from the data table TB based on phase current peak value Ip and flux linkage Ψp, into the abovementioned second rotor position calculation formula (Formula 7).

The selecting unit 30 selects one of the first rotor position determining unit 28 and the second rotor position determining unit 29. When the first rotor position determining unit 28 is selected, first rotor position θm1 determined by the first rotor position determining unit 28 is input into the rotation control unit 21 as rotor position θm, whereas when the second rotor position determining unit 29 is selected, second rotor position θm2 determined by the second rotor position determining unit 29 is input into the rotation control unit 21 as rotor position θm. Hereinbelow, selection from the first rotor position determining unit 28 and the second rotor position determining unit 29 performed by the selecting unit 30 will be described.

Figure 5A:
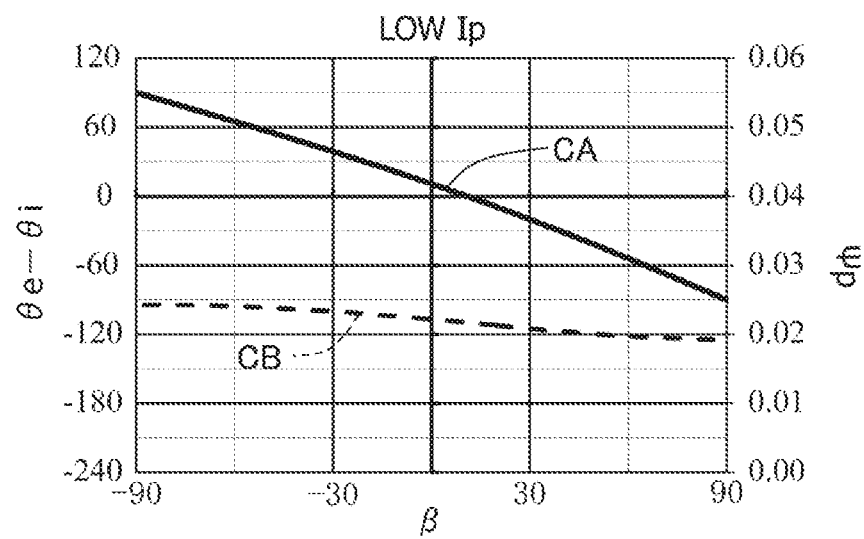
Figure 5B:
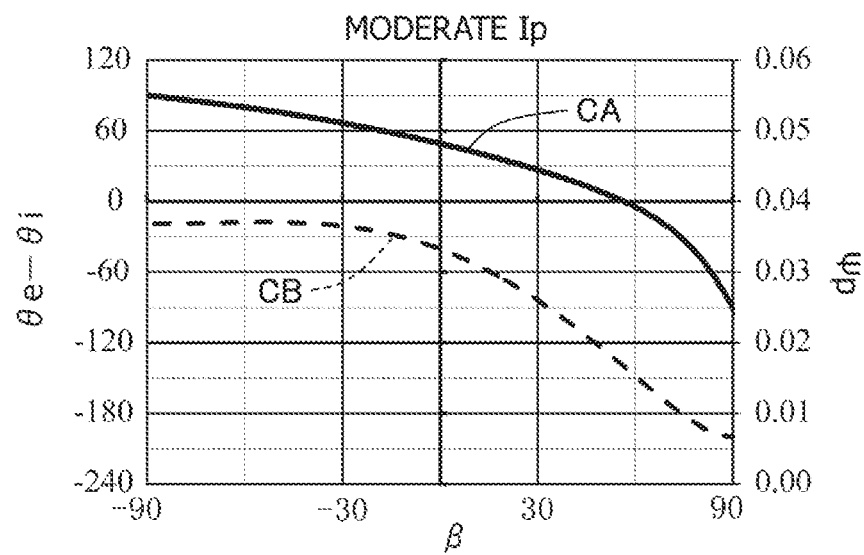
Figure 5C:
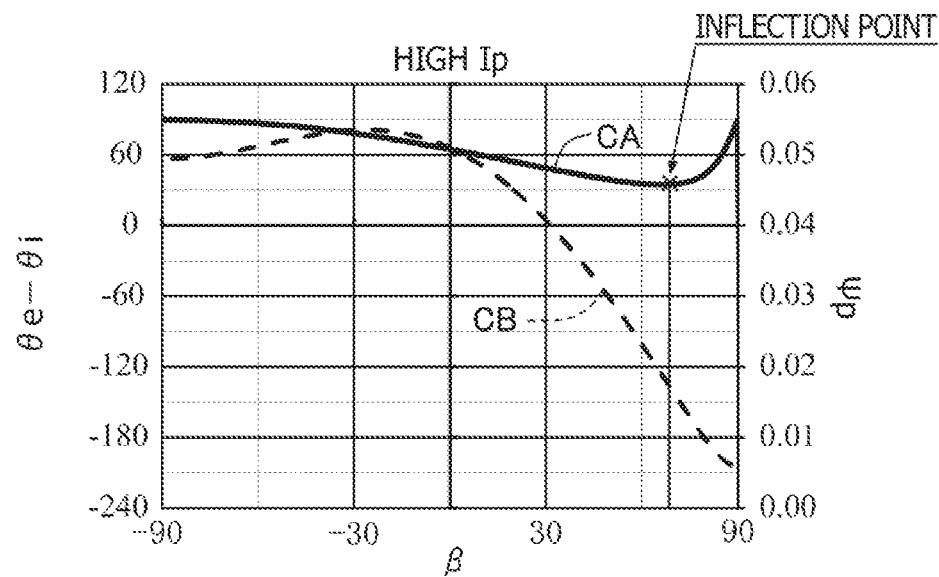

FIGS. 5A to 5C are graphs for illustrating the data table TA for use in the first rotor position determining unit 28 and the data table TB for use in the second rotor position determining unit 29. FIG. 5A is a graph indicating a case in which phase current peak value Ip is low (e.g., Ip=5 A), FIG. 5B is a graph indicating a case in which phase current peak value Ip is moderate (e.g., Ip=30 A), and FIG. 5C is a graph indicating a case in which phase current peak value Ip is high (e.g., Ip=55 A). In each of FIGS. 5A to 5C, curve CA (solid line) indicating the relationship between current phase β and [(induced voltage electrical angle θe)–(phase current electrical angle θi)] corresponds to the data table TA, and curve CB (broken line) indicating the relationship between current phase β and flux linkage Ψp corresponds to the data table TB.

In a case in which phase current peak value Ip is low and a case in which phase current peak value Ip is moderate (FIGS. 5A and 5B), an amount of change in flux linkage Ψp with respect to a change in current phase β (see curve CB) is extremely small compared to an amount of change in [(induced voltage electrical angle θe)–(phase current electrical angle θi)] with respect to a change in current phase β (see curve CA). Furthermore, curve CA indicating the relationship between current phase β and [(induced voltage electrical angle θe)–(phase current electrical angle θi)] has no inflection point, and current phase β and [(induced voltage electrical angle θe)–(phase current electrical angle θi)] have a one-to-one correspondence.

In a case in which phase current peak value Ip is high (FIG. 5C), curve CA indicating the relationship between current phase β and [(induced voltage electrical angle θe)–(phase current electrical angle θi)] has an inflection point near current phase β of 70°. This indicates that in a range in which current phase β is much advanced, current phase β cannot be obtained from the data table TA with high accuracy. On the other hand, curve CB indicating the relationship between current phase β and flux linkage Ψp has no inflection point in a range in which current phase β is advanced, and an amount of change in flux linkage Ψp with respect to a change in current phase β is large. Furthermore, as described above, current phase β is much advanced mainly in a case in which the flux-weakening control is performed (i.e., in a high rotational speed region).

Thus, in the present embodiment, the selecting unit 30 obtains a current phase (second current phase β2) from the data table TB (curve CB) in the high rotational speed region in which the flux-weakening control is performed (hereinafter, referred to as "flux-weakening-control region"), and selects the second rotor position determining unit 29 that determines a rotor position (second rotor position θm2) by using the obtained current phase (second current phase β2). In contrast, in the normal-control region that is the remainder region, the selecting unit 30 obtains a current phase (first current phase β1) from the data table TA (curve CA), and selects the first rotor position determining unit 28 that determines a rotor position (first rotor position θm1) by using the obtained current phase (first current phase β1).

As described in the foregoing, the motor control device 10 according to the present embodiment includes the first rotor position determining unit 28, the second rotor position determining unit 29, and the selecting unit 30 that selects the first rotor position determining unit 28 or the second rotor position determining unit 29. The selecting unit 30 selects the first rotor position determining unit 28 in the normal-control region that is other than the flux-weakening-control region, and selects the second rotor position determining unit 29 in the flux-weakening-control region. This makes the motor control device 10 possible to determine a rotor position with high accuracy in both of the normal-control region and the flux-weakening-control region compared to the conventional one, so that it is possible to increase a rotational speed range in which the synchronous motor 11 is operable (in particular, the high rotational speed region).

Next, modifications to the above embodiment will be described.

Modification 1

In the above embodiment, the first rotor position determining unit 28 determines a rotor position (first rotor position θm1) from phase current electrical angle θi and first current phase β1 that is obtained based on phase current peak value Ip and [(induced voltage electrical angle θe)–(phase current electrical angle θi)]. However, the present invention is not limited thereto. The first rotor position determining unit 28 may be configured to determine first rotor position θm1 from induced voltage electrical angle θe and first induced voltage phase γ1 that is obtained based on phase current peak value Ip and [(induced voltage electrical angle θe)–(phase current electrical angle θi)]. In this case, the first rotor position determining unit 28 determines first rotor position θm1 by using a third rotor position calculation formula expressed as the following Formula 8.

(First rotor position θ$m$1)=(induced voltage electrical angle θ$e$)–(first induced voltage phase γ1)–90°   Formula 8

First induced voltage phase γ1 in Formula 8 is selected by referring to a data table TC, the data table TC being generated in advance and including phase current peak value Ip and [(induced voltage electrical angle θe)–(phase current electrical angle θi)] as parameters. For example, the data table TC may be generated as follows, and stored in advance in a memory.

The data table TC in this case is also generated in advance based on the fact that Formula 5 and Formula 6 hold in the motor vector diagram of FIG. 4. That is, the data table TC of first induced voltage phase γ1, including phase current peak value Ip corresponding to current I and [(induced voltage electrical angle θe)–(phase current electrical angle θi)] corresponding to [(induced voltage phase γ)–(current phase β)] as parameters, is generated by storing induced voltage phases γ at the time when [(induced voltage phase γ)–(current phase β)] becomes predetermined values while progressively increasing current phase β and current I indicated in the motor vector diagram within predetermined ranges.

Specifically, for example, while increasing current phase β from –180° to 180° by 0.001° and increasing current I from 0 A to 64 A by 1 A, voltage phases α, current phases β, and induced voltage phases γ are obtained based on the motor vector diagram, using intrinsic d- and q-axis inductances Ld, Lq of the synchronous motor 11. Then, induced voltage phases γ at the time when [(induced voltage phase γ)–(current phase β)] becomes 1°, 2°, 3°, . . . , are stored. Thereby generated is the data table TC of first induced voltage phase γ1, including phase current peak value Ip corresponding to current I as a parameter, and [(induced voltage electrical angle θe)–(phase current electrical angle θi)] corresponding to [(induced voltage phase γ)–(current phase β)] as another parameter.

Then, the first rotor position determining unit 28 determines (calculates) first rotor position θm1 by inserting induced voltage electrical angle θe and first induced voltage phase γ1 that is selected from the data table TC based on phase current peak value Ip and [(induced voltage electrical angle θe)–(phase current electrical angle θi)], into the abovementioned third rotor position calculation formula (Formula 8).

Modification 2

In the above embodiment, the second rotor position determining unit 29 determines (calculates) second rotor position θm2 from phase current electrical angle θi and second current phase β2 that is obtained based on phase current peak value Ip and flux linkage Ψp. However, the present invention is not limited thereto. The second rotor position determining unit 29 may be configured to determine (calculate) second rotor position θm2 from induced voltage electrical angle θe and second induced voltage phase γ2 that is obtained based on phase current peak value Ip and flux linkage Ψp. In this case, the second rotor position determining unit 29 determines second rotor position θm2 by using a fourth rotor position calculation formula expressed as the following Formula 9.

(Second rotor position θ$m$2)=(induced voltage electrical angle θ$e$)–(second induced voltage phase γ2)–90°   Formula 9

Second induced voltage phase γ2 in Formula 9 is selected by referring to a data table TD, the data table TD being generated in advanced and including phase current peak value Ip and flux linkage Ψp as parameters. For example, the data table TD may be generated as follows, and stored in advance in a memory.

The data table TD in this case is also generated in advance based on the fact that Formula 5 and Formula 6 hold in the motor vector diagram of FIG. 4. That is, the data table TD of second induced voltage phase γ2, including phase current peak value Ip corresponding to current I and flux linkage Ψp determined by the linkage determining unit 27 corresponding to flux linkage Ψ, as parameters, is generated by storing induced voltage phases γ at the time when flux linkage Ψ becomes predetermined values while progressively increasing current phase β and current I indicated in the motor vector diagram within predetermined ranges.

Specifically, for example, while increasing current phase β from –180° to 180° by 0.001° and increasing current I from 0 A to 64 A by 1 A, induced voltage phases γ and flux linkages Ψ are obtained. Then, induced voltage phase γ corresponding to each flux linkage Ψ is stored. Thereby generated is the data table TD of second induced voltage phase γ2, including phase current peak value Ip corresponding to current I as a parameter, and flux linkage Ψp determined by the linkage determining unit 27 corresponding to flux linkage Ψ as another parameter.

Then, the second rotor position determining unit 29 determines (calculates) second rotor position θm2 by inserting induced voltage electrical angle θe and second induced voltage phase γ2 that is selected from the data table TD based on flux linkage Ψp, into the abovementioned fourth rotor position calculation formula (Formula 9).

Typically, Modifications 1 and 2 may be employed at the same time. That is, it is preferable, when the first rotor position determining unit 28 determines first rotor position θm1 by using the abovementioned third rotor position calculation formula (Formula 8), the second rotor position determining unit 29 determines second rotor position θm2 by using the fourth rotor position calculation formula (Formula 9).

Modification 3

In the above embodiment, the selecting unit 30 selects the first rotor position determining unit 28 in the normal-control region, and selects the second rotor position determining unit 29 in the flux-weakening-control region. However, the present invention is not limited thereto. The selecting unit 30 may be configured such that in a case in which phase current peak value Ip is low and a case in which phase current peak value Ip is moderate, in other word, when phase current peak value Ip is less than or equal to a predetermined value, the selecting unit 30 selects the first rotor position determining unit 28, and in a case in which phase current peak value Ip is high, in other word, when phase current peak value Ip is greater than the predetermined value, the selecting unit 30 selects the second rotor position determining unit 29.

Modification 4

Furthermore, the selecting unit 30 may be configured to perform selection from (or switching between) the first rotor position determining unit 28 and the second rotor position determining unit 29 based on first current phase β1 obtained by the first rotor position determining unit 28 or second current phase β2 obtained by the second rotor position determining unit 29. For example, the selecting unit 30 may be configured such that the selecting unit 30 selects the first rotor position determining unit 28 when the synchronous motor 11 starts up, and monitors first current phase β1 selected from the data table TA by the first rotor position determining unit 28, and then, the selecting unit 30 selects the second rotor position determining unit 29 when first current phase β1 exceeds a first threshold to switch from the first rotor position determining unit 28 to the second rotor position determining unit 29. In this case, after selecting the second rotor position determining unit 29, the selecting unit 30 monitors second current phase β2 selected from the data table TB by the second rotor position determining unit 29, and if second current phase β2 decreases to or below the first threshold or a second threshold that is less than the first threshold, the selecting unit 30 selects the first rotor position determining unit 28 to switch from the second rotor position determining unit 29 to the first rotor position determining unit 28. The first and second thresholds may be appropriately set depending on characteristics or the like of the synchronous motor 11. For example, the first and second thresholds may be set to values greater than 0° and less than a phase which corresponds to the inflection point of curve CA indicated in FIG. 5C (i.e., near 70°).

When Modifications 1 and 2 are employed at the same time, first current phase β1 is replaced with first induced voltage phase γ1, and second current phase β2 is replaced with second induced voltage phase γ2. Thus, the selecting unit 30 may be configured as follows. That is, the selecting unit 30 selects the first rotor position determining unit 28 when the synchronous motor 11 starts up, and monitors first induced voltage phase γ1 selected from the data table TC by the first rotor position determining unit 28. Then, the selecting unit 30 selects the second rotor position determining unit 29 when first induced voltage phase γ1 exceeds a third threshold, to switch from the first rotor position determining unit 28 to the second rotor position determining unit 29. Furthermore, after selecting the second rotor position determining unit 29, the selecting unit 30 monitors second induced voltage phase γ2 selected from the data table TD by the second rotor position determining unit 29, and if second induced voltage phase γ2 decreases to or below the third threshold or a fourth threshold that is less than the third threshold, the selecting unit 30 selects the first rotor position determining unit 28, to switch from the second rotor position determining unit 29 to the first rotor position determining unit 28. Here, the first or third threshold in Modification 4 corresponds to "a first threshold" of the present invention, and the second or fourth threshold in Modification 4 corresponds to "a second threshold" of the present invention.

Figure 6:
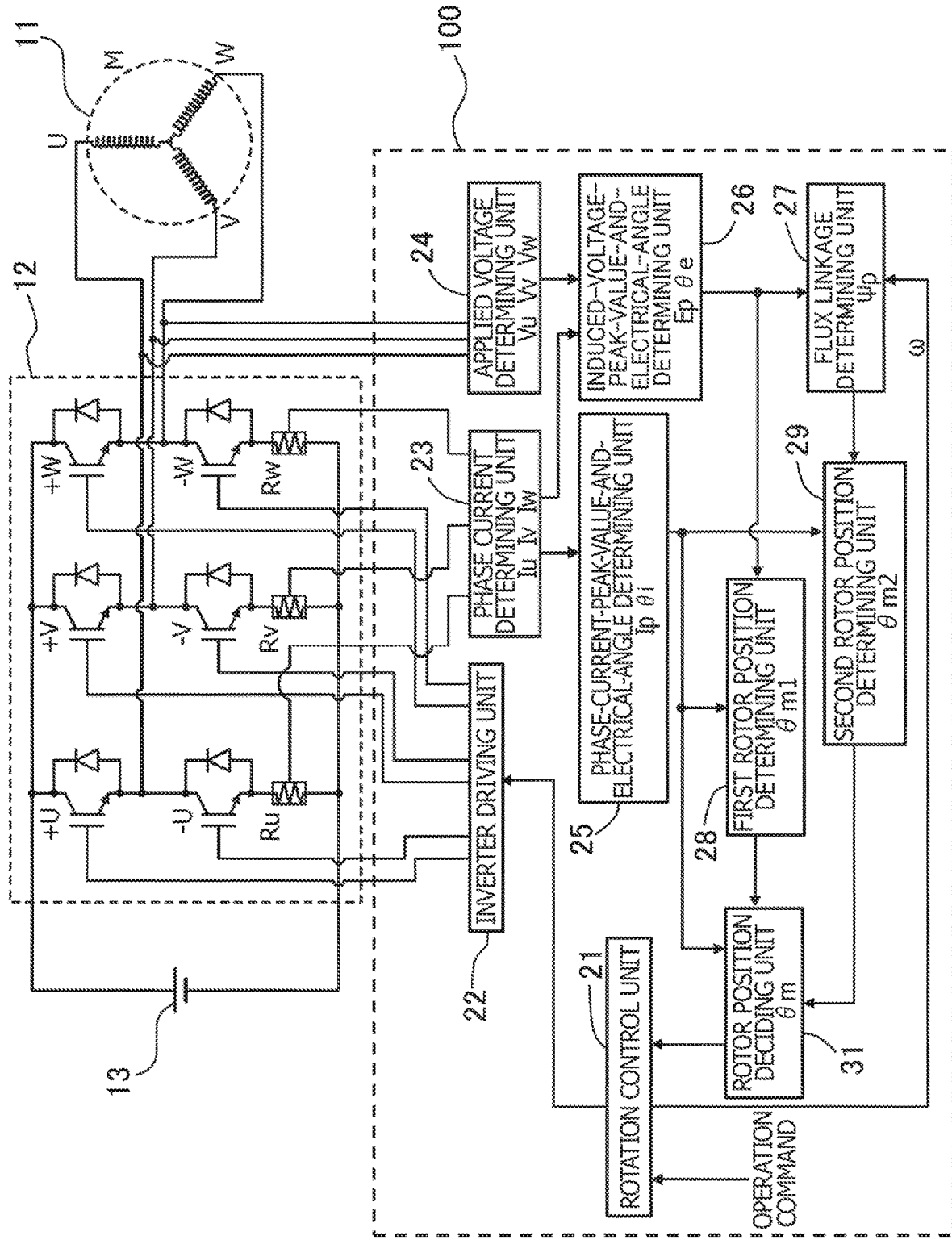
FIG. 6 is a block diagram of a motor control device according to another embodiment of the present invention.
Figure 7A:
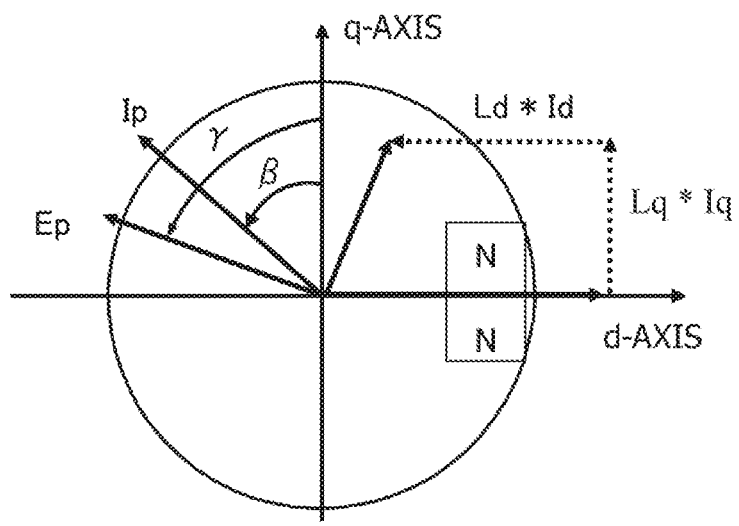
Figure 7B:
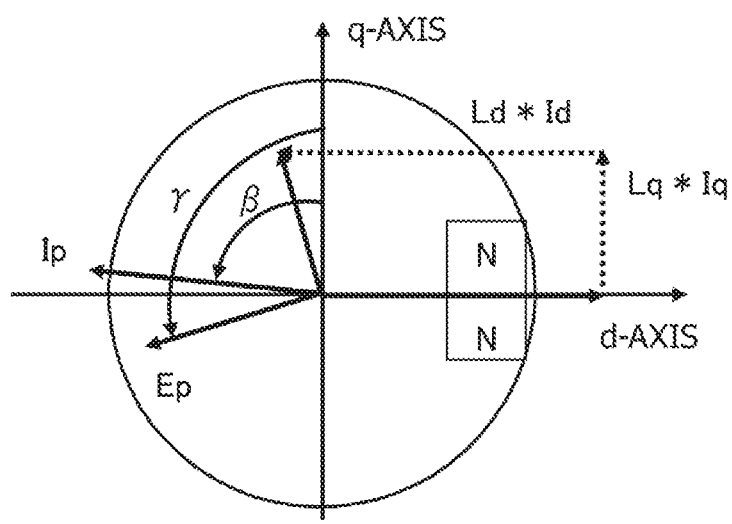

Next, a motor control device 100 according to another embodiment will be described. FIG. 6 is a block diagram of the motor control device 100 according to said another embodiment of the present invention. The motor control device 100 differs from the motor control device 10 (FIG. 1) according to the abovementioned embodiment in that the motor control device 100 illustrated in FIG. 6 includes a rotor position deciding unit 31 instead of the selecting unit 30. The remaining configurations other than the rotor position deciding unit 31 are the same as those in the motor control device 10 of the abovementioned embodiment.

In the motor control device 100, the rotor position deciding unit 31 decides a final rotor position θm by obtaining a weighted sum of first rotor position θm1 determined by the first rotor position determining unit 28 and second rotor position θ2 determined by the second rotor position determining unit 29. Specifically, the rotor position deciding unit 31 decides (calculates) rotor position θm by the following Formula 10.

$$\theta m = (1-n) \times \theta m1 + n \times \theta m2 \qquad \text{Formula 10}$$

Weighting factor n in Formula 10 may be set to a freely selected value that is less than 1 (including 0). For example, weighting factor n may be set to 0 in the normal-control region and may be set to 1 in the flux-weakening-control region. Furthermore, the greater phase current peak value Ip is, the greater weighting factor n may be set. Furthermore, the greater first current phase β1 or first induced voltage phase γ1 (i.e., more advanced), the greater weighting factor n may be set.

Also in the motor control device 100, similar to the motor control device 10, it is possible to determine a rotor position with high accuracy in both of the normal-control region and the flux-weakening-control region. Thus, compared with the conventional one, it is possible to increase a rotational speed range in which the synchronous motor 11 is operable.

Although the embodiments and modifications of the present invention have been described in the foregoing, the present invention is not limited thereto, and further modifications and changes can be made based on the technical concept of the present invention.

REFERENCE SYMBOL LIST

10 Motor control device
11 Synchronous motor
12 Inverter
13 Direct-current power supply
21 Rotation control unit
22 Inverter driving unit
23 Phase current determining unit (current determining unit)
24 Applied voltage determining unit
25 Phase-current-peak-value-and-electrical-angle determining unit (current-peak-value-and-electrical-angle determining unit)
26 Induced-voltage-peak-value-and-electrical-angle determining unit
27 Linkage determining unit
28 First rotor position determining unit
29 Second rotor position determining unit
30 Selecting unit
31 Rotor position deciding unit

The invention claimed is:

1. A motor control device comprising:
   a current determining unit that determines a current flowing through a stator coil of a synchronous motor;
   an applied voltage determining unit that determines an applied voltage applied to the stator coil;
   a current-peak-value-and-electrical-angle determining unit that determines a current peak value and a current electrical angle based on a current determined by the current determining unit;
   an induced-voltage-peak-value-and-electrical-angle determining unit that determines an induced voltage peak value and an induced voltage electrical angle based on a current determined by the current determining unit and an applied voltage determined by the applied voltage determining unit;
   a flux linkage determining unit that determines a flux linkage of a rotor of the synchronous motor based on an induced voltage peak value and a rotational speed of the synchronous motor;
   a first rotor position determining unit that determines a rotor position of the synchronous motor by using a rotor position calculation formula with, as parameters, a current electrical angle or an induced voltage electrical angle, and a first electrical phase or a first current voltage phase obtained based on a current peak value and [(induced voltage electrical angle)−(current electrical angle)];
   a second rotor position determining unit that determines a rotor position of the synchronous motor by using a rotor position calculation formula with, as parameters, a current electrical angle or an induced voltage electrical angle, and a second current phase or a second induced voltage phase obtained based on a current peak value and a flux linkage; and
   a selecting unit that selects one of the first rotor position determining unit and the second rotor position determining unit.

2. The motor control device according to claim 1, wherein the selecting unit selects the first rotor position determining unit in a normal-control region that is other than a flux-weakening-control region, and selects the second rotor position determining unit in the flux-weakening-control region.

3. The motor control device according to claim 1, wherein the selecting unit selects the first rotor position determining unit when a current determined by the current determining unit is less than or equal to a predetermined value, and selects the second rotor position determining unit when a current determined by the current determining unit is greater than the predetermined value.

4. The motor control device according to claim 1, wherein the selecting unit selects the first rotor position determining unit when the synchronous motor starts up, and then, when a first current phase or a first induced voltage phase obtained by the first rotor position determining unit exceeds a first threshold, the selecting unit selects the second rotor position determining unit.

5. The motor control device according to claim 4, wherein after selecting the second rotor position determining unit, the selecting unit selects the first rotor position determining unit when a second current phase or a second induced voltage phase obtained by the second rotor position determining unit decreases to or below the first threshold or a second threshold that is less than the first threshold.

6. A motor control device comprising:
   a current determining unit that determines a current flowing through a stator coil of a synchronous motor;
   an applied voltage determining unit that determines an applied voltage applied to the stator coil;
   a current-peak-value-and-electrical-angle determining unit that determines a current peak value and a current electrical angle based on a current determined by the current determining unit;
   an induced-voltage-peak-value-and-electrical-angle determining unit that determines an induced voltage peak value and an induced voltage electrical angle based on a current determined by the current determining unit and an applied voltage determined by the applied voltage determining unit;
   a flux linkage determining unit that determines a flux linkage of a rotor of the synchronous motor based on an induced voltage peak value and a rotational speed of the synchronous motor;
   a first rotor position determining unit that determines a rotor position of the synchronous motor by using a rotor position calculation formula with, as parameters, a current electrical angle or an induced voltage electrical angle, and a first current phase or a first induced voltage phase obtained based on a current peak value and [(induced voltage electrical angle)−(current electrical angle)];
   a second rotor position determining unit that determines a rotor position of the synchronous motor by using a rotor position calculation formula with, as parameters, a current electrical angle or an induced voltage electrical angle, and a second current phase or a second induced voltage phase obtained based on a current peak value and a flux linkage; and
   a rotor position deciding unit that decides a final rotor position by obtaining a weighted sum of a rotor position determined by the first rotor position determining unit and a rotor position determined by the second rotor position determining unit.

* * * * *